(12) United States Patent
Seo

(10) Patent No.: US 11,381,068 B2
(45) Date of Patent: Jul. 5, 2022

(54) ELECTRICAL WIRING STRUCTURE WITH CONNECTION POINTS ARRANGED ON SIDE WALLS AND BUILDING CONSTRUCTION METHOD

(71) Applicant: SANG GUN CO., LTD., Wonju-si (KR)

(72) Inventor: Sang Jin Seo, Wonju-si (KR)

(73) Assignee: SANG GUN CO., LTD., Wonju-si (KR)

( * ) Notice: Subject to any disclaimer, the term of this patent is extended or adjusted under 35 U.S.C. 154(b) by 406 days.

(21) Appl. No.: 16/611,691

(22) PCT Filed: May 30, 2018

(86) PCT No.: PCT/KR2018/006121
§ 371 (c)(1),
(2) Date: Nov. 7, 2019

(87) PCT Pub. No.: WO2018/221947
PCT Pub. Date: Dec. 6, 2018

(65) Prior Publication Data
US 2020/0136363 A1    Apr. 30, 2020

(30) Foreign Application Priority Data

May 31, 2017 (KR) .................. 10-2017-0067370

(51) Int. Cl.
*H02G 3/08* (2006.01)
*H02G 3/38* (2006.01)
*H02G 1/08* (2006.01)

(52) U.S. Cl.
CPC ............... *H02G 3/381* (2013.01); *H02G 1/08* (2013.01); *H02G 3/08* (2013.01); *H02G 3/383* (2013.01); *H02G 3/386* (2013.01)

(58) Field of Classification Search
CPC ............ H02G 3/381; H02G 1/08; H02G 3/08; H02G 3/083; H02G 3/386; H02G 3/12;
(Continued)

(56) References Cited

U.S. PATENT DOCUMENTS 4,367,417 A * 1/1983 Casasanta ................. F21S 2/00
174/491
4,646,211 A * 2/1987 Gallant .................. H01R 25/16
174/481
(Continued)

FOREIGN PATENT DOCUMENTS

CN           1134382 A    10/1996
CN         104682297 A     6/2015
(Continued)

*Primary Examiner* — Angel R Estrada
(74) *Attorney, Agent, or Firm* — Rabin & Berdo, P.C.

(57) ABSTRACT

Disclosed herein are an electrical wiring structure with connection points arranged on side walls and a building construction method, which can improve convenience of electrical wiring construction and reduce electrical wiring materials. The electrical wiring structure includes a first power wire drawn out of a distribution box and disposed through a first conduit embedded in a concrete-made bottom base of an indoor space, a first joint box embedded at a predetermined height in a first side wall formed in the indoor space and electrically connected to the first power wire, a first light wire electrically connected to the first joint box, and a second joint box embedded at a predetermined height in a second side wall formed in the indoor space and electrically connected to the first joint box by a second power wire disposed through a second conduit embedded in the bottom base of the indoor space.

6 Claims, 6 Drawing Sheets

(58) Field of Classification Search
CPC .. H02G 3/06; H02G 3/10; H02G 3/28; H02G 3/281; H02G 3/283; H02G 3/00; H02G 3/36; H02G 3/38; H02G 3/383; H01R 13/70; H01R 9/00; E04F 17/08
USPC ............. 174/482, 480, 481, 491, 68.1, 68.3; 220/3.2, 3.3, 4.02; 248/906, 68.1, 49; 52/220.1, 220.3, 220.2, 220.8
See application file for complete search history.

(56) References Cited

U.S. PATENT DOCUMENTS

| | | | | |
|---|---|---|---|---|
| 5,704,175 A * | 1/1998 | Lewis | ................... | H02G 3/0431 174/482 |
| 6,216,406 B1 * | 4/2001 | Hauser | ................. | H02G 3/0425 174/481 |
| 8,107,785 B2 * | 1/2012 | Berglund | ............ | G02B 6/4441 174/481 |
| 9,608,418 B1 * | 3/2017 | Elberbaum | .............. | H02G 3/16 |
| 10,431,966 B2 | 10/2019 | Chen et al. | | |

FOREIGN PATENT DOCUMENTS

| | | |
|---|---|---|
| JP | H06-165344 A | 6/1994 |
| JP | H07-36535 U | 7/1995 |
| JP | 8-216977 A | 8/1996 |
| KR | 100235582 B1 | 12/1999 |
| KR | 20-0355740 Y1 | 7/2004 |
| KR | 10-2007-0112606 A | 11/2007 |
| KR | 10-2008-0001676 A | 1/2008 |

* cited by examiner

ELECTRICAL WIRING STRUCTURE WITH CONNECTION POINTS ARRANGED ON SIDE WALLS AND BUILDING CONSTRUCTION METHOD

TECHNICAL FIELD

The present invention relates to an electrical wiring structure with connection points arranged on side walls and a building construction method, and more particularly, to a technique that enables indoor electrical wiring to be easily constructed by arranging connection points for electrical wiring on building side walls.

BACKGROUND ART

In general, electrical wiring work in apartment houses such as apartments is performed at each construction site thereof by pushing electric wires into pipes buried in concrete walls or concrete slabs, cutting the electric wires whose certain lengths are exposed from switch boxes, outlet boxes, or light boxes, and then installing supports for plastering of the walls or for ceilings, to construct electrical wiring by fixedly connecting switches or outlets to the electric wires in the switch boxes or outlet boxes and connecting circular plates for sealing support or indoor lights to the electric wires on the ceilings.

FIG. 1 is a front cross-sectional view illustrating a conventional electrically-wired apartment house. FIG. 2 is a top view illustrating the conventional electrically-wired apartment house.

In a conventional apartment house such as an apartment, a power wire 171 drawn out of a distribution box 210 is arranged through a joint box 140 disposed at the center of a compartmental indoor ceiling 130 before concrete is placed. That is, the power wire 171 is arranged along the center of the compartmental indoor ceiling 130. A light wire 173 is arranged between the joint box 140, disposed at the center of the compartmental indoor ceiling 130, and a switch box 150 installed at a predetermined height on a side wall 120 of a compartmental door. A light 160 is disposed below the joint box 140.

According to the conventional electrical wiring construction method described above, an electrical wiring technician has to climb up an A-shaped ladder to interconnect the power wire 171 and the light wire 173 in the joint box 140 since a connection point is formed in the joint box 140 on the ceiling 130, which leads to inconvenience in that technicians have to work in teams of two. Even in case of maintenance due to poor connection or short circuit, it is inconvenient to remove a gypsum board, installed under concrete, around the center of the indoor ceiling 130.

In addition, as illustrated in FIG. 2, the power wire 171 drawn out of the distribution box 210 has to be arranged along the center of the compartmental indoor ceiling 130 in the related art, which causes unnecessary waste of material in the power wire 171.

DISCLOSURE

Technical Problem

The present invention has been made in view of the above problems, and an object thereof is to provide an electrical wiring structure with connection points arranged on side walls and a building construction method, which can improve convenience of electrical wiring construction by arranging connection points for electrical wiring on indoor side walls.

Another object of the present invention is to provide an electrical wiring structure with connection points arranged on side walls and a building construction method, which can reduce electrical wiring materials by arranging power wires along indoor side walls.

Technical Solution

In accordance with an aspect of the present invention, there is provided an electrical wiring structure with connection points arranged on side walls, which includes a first power wire drawn out of a distribution box and disposed through a first conduit embedded in a concrete-made bottom base or ceiling top of an indoor space, a first joint box embedded at a predetermined height in a first side wall formed in the indoor space and electrically connected to the first power wire, a first light wire electrically connected to the first joint box, and a second joint box embedded at a predetermined height in a second side wall formed in the indoor space and electrically connected to the first joint box by a second power wire disposed through a second conduit embedded in the bottom base or ceiling top of the indoor space.

The first joint box may double as a switch box configured to switch a first light electrically connected to a first light box by the first light wire.

The first joint box may double as a receptacle box electrically connected to the first and second power wires. The first and second power wires may be disposed in the first and second conduits embedded immediately below or above the first and second joint boxes.

In accordance with another aspect of the present invention, there is provided a method of constructing electrical wiring with connection points arranged on side walls, which includes embedding a joint box at a predetermined height in a side wall formed in an indoor space of a building, embedding a conduit immediately below or above the joint box and in a concrete-made bottom base or ceiling top of the indoor space, electrically connecting a distribution box to the joint box using a power wire passing through the conduit, and electrically connecting the joint box to a light box embedded in the ceiling of the indoor space using a light wire.

Advantageous Effects

In accordance with an electrical wiring structure with connection points arranged on side walls and a building construction method of the present invention, it is possible to improve convenience of electrical wiring construction by arranging connection points for electrical wiring on indoor side walls and to reduce electrical wiring materials by arranging power wires along the indoor side walls.

MODE FOR INVENTION

Figure 1:
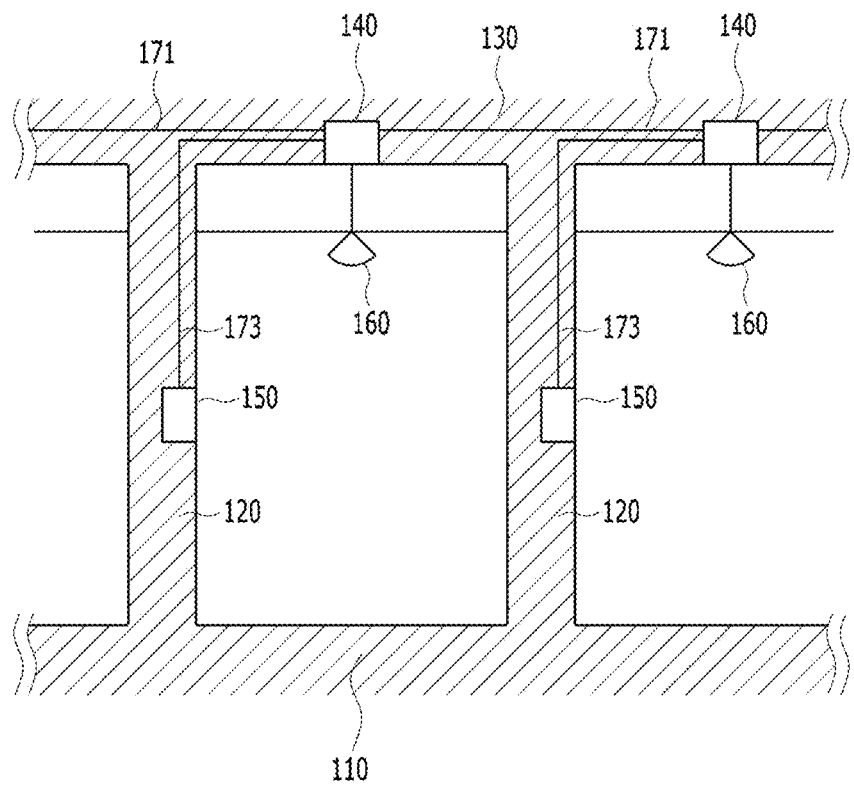
FIG. 1 is a front cross-sectional view illustrating a conventional electrically-wired apartment house.
Figure 2:
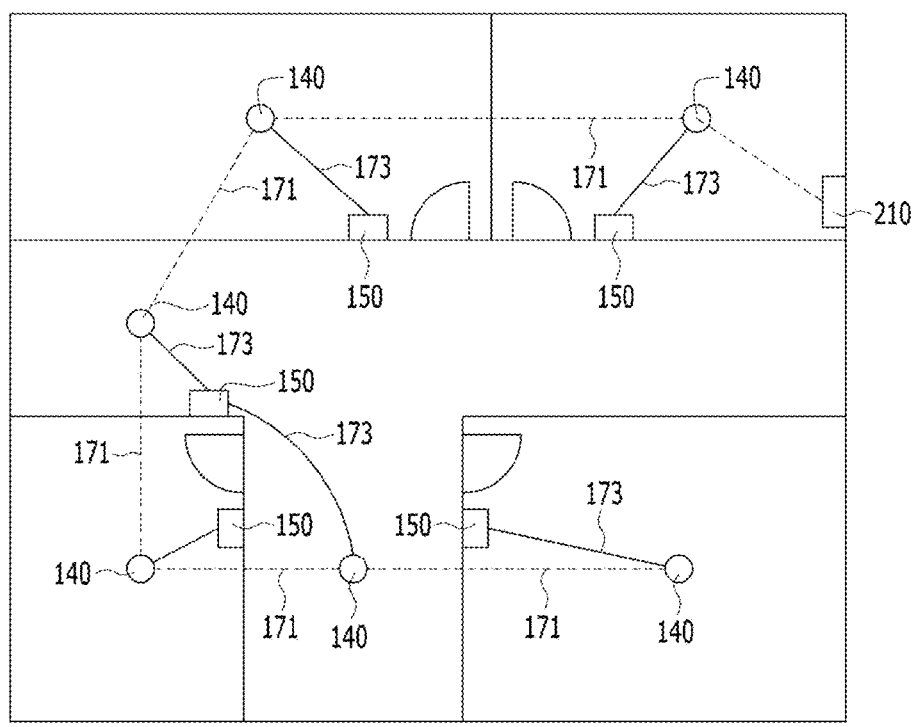
FIG. 2 is a top view illustrating the conventional electrically-wired apartment house.

Additional objects, features, and advantages of the present invention will be more clearly understood from the following detailed description taken in conjunction with the accompanying drawings.

Prior to the detailed description of the present disclosure, the present disclosure may be variously modified and may have various embodiments, and it should be understood that examples to be described below and illustrated in the drawings is not intended to limit the present disclosure to specific embodiments and include all modifications, equivalents, and substitutes included in the spirit and technical range of the present disclosure.

It will be understood that when an element is referred to as being "connected" or "coupled" to another element, it can be directly connected or coupled to the other element or intervening elements may be present therebetween. In contrast, when an element is referred to as being "directly connected" or "directly coupled" to another element, there are no intervening elements therebetween.

The terminology used herein is for the purpose of describing particular embodiments only and is not intended to limit the disclosure. As used herein, the singular forms "a", "an" and "the" include the plural forms as well, unless the context clearly indicates otherwise. It will be further understood that the terms "comprises", "comprising,", "includes" and/or "including", when used herein, specify the presence of stated features, numbers, steps, operations, elements, components, or combinations thereof, but do not preclude the presence or addition of one or more other features, numbers, steps, operations, elements, components, or combinations thereof.

Furthermore, in the following description with reference to the accompanying drawings, the same reference numerals are given to the same components and a redundant description thereof will be omitted. Detailed descriptions related to well-known functions or configurations will be ruled out in order not to unnecessarily obscure subject matters of the present disclosure.

Figure 3:
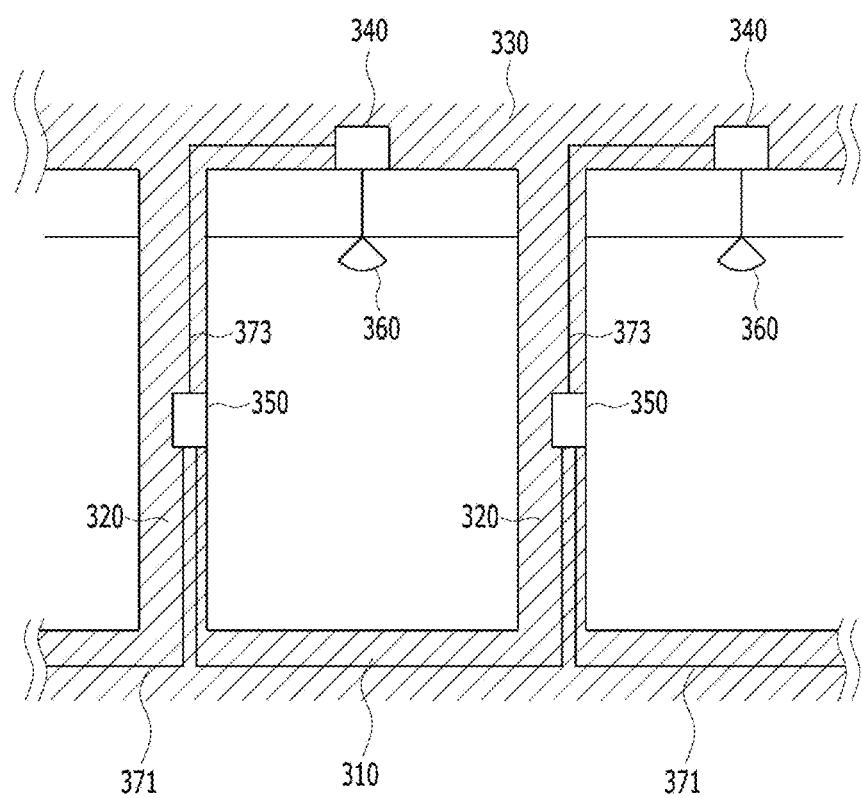
FIG. 3 is a front cross-sectional view illustrating an electrically-wired apartment house according to an embodiment of the present invention.
Figure 5:
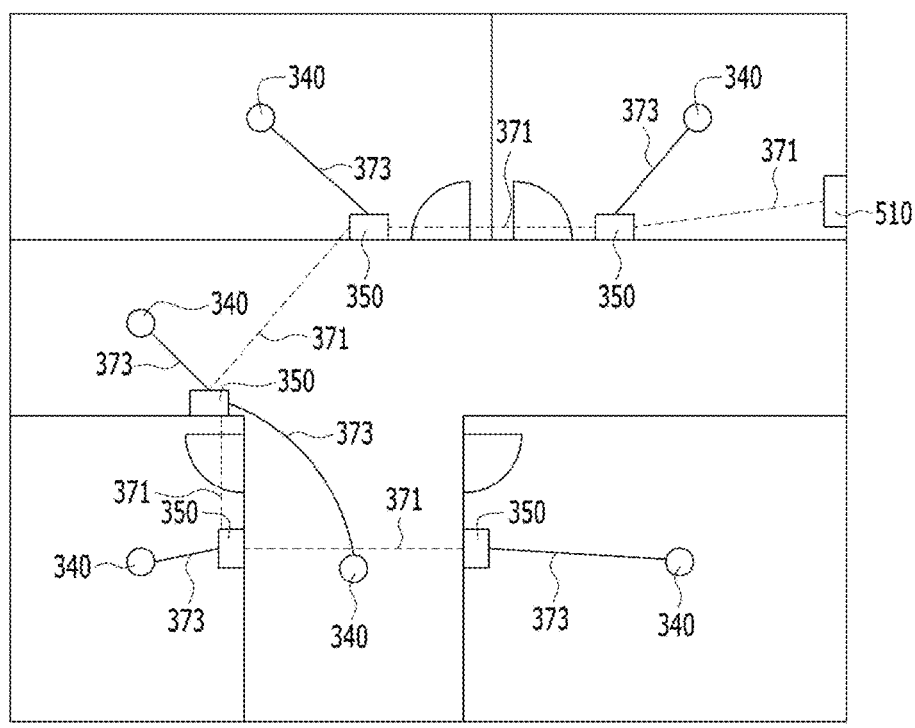
FIG. 5 is a top view illustrating the electrically-wired apartment house according to the embodiment of the present invention.
Figure 6:
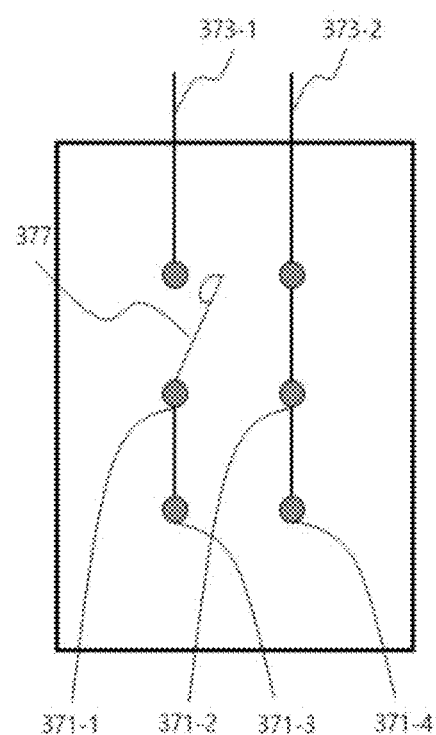
FIG. 6 is an electrical wiring diagram in a switch box according to the embodiment of the present invention.

FIG. 3 is a front cross-sectional view illustrating an electrically-wired apartment house according to an embodiment of the present invention. FIG. 5 is a top view illustrating the electrically-wired apartment house according to the embodiment of the present invention. FIG. 6 is an electrical wiring diagram in a switch box according to the embodiment of the present invention.

According to a building construction method of the present invention, a conduit (not illustrated) is first disposed in a section in which a power wire 371 and a light wire 373 must be arranged. Since a process of placing and curing concrete after disposing the conduit is obvious, a description thereof will be omitted. Then, according to the embodiment of the present invention, the power wire 371, which is drawn out of a distribution box 510 in a building, may be connected to a switch-joint box 350 installed on a compartmental side wall 320 along a bottom base 310 of an indoor space through the conduit (not illustrated).

In addition, the power wire 371 is connected between a switch-joint box 350 installed on a side wall 320 and a switch-joint box 350 installed on another side wall 320. The light wire 373 is connected between the switch-joint box 350 installed on the compartmental side wall 320 and a light box 340 installed at the center of a ceiling. A light 360 is connected to the light box 340. The light 360 may be classified into, but not limited thereto, a fluorescent light, an incandescent light, and an LED light according to the lighting fixture thereof. The light 360 may be classified into, but not limited thereto, a recessed light and a pendant light according to the lighting type thereof.

According to the embodiment of the present invention, light wires 373-1 and 373-2, lead-in power wires 371-1 and 371-2, and lead-out power wires 371-3 and 371-4 may be respectively fitted into the upper holes, center holes, and lower holes of the switch-joint box 350. Alternatively, according to another embodiment of the present invention, lead-out power wires 371-3 and 371-4 and lead-in power wires 371-1 and 371-2 may be respectively fitted into the center holes and lower holes of the switch-joint box 350.

According to another example of the present invention, although not illustrated, a power wire 371, which is drawn out of a distribution box 510 in a building, may be connected to a switch-joint box 350 installed on a compartmental side wall 320 along a ceiling top of an indoor space through a conduit (not illustrated).

Thus, according to another example of the present invention, all light wires 373-1 and 373-2, lead-in power wires 371-1 and 371-2, and lead-out power wires 371-3 and 371-4 connected to the switch-joint box 350 may be directed to the ceiling top along the side wall.

According to still another example of the present invention, although not illustrated, a power wire, which is drawn out of a distribution box 510 in a building, may be connected to a switch-joint box installed on a compartmental side wall along a ceiling top of an indoor space. The power wire may be connected between a switch-joint box and another switch-joint box along a bottom base of the indoor space.

According to a further example of the present invention, although not illustrated, a power wire, which is drawn out of a distribution box 510 in a building, may be connected to a switch-joint box installed on a compartmental side wall along a bottom base of an indoor space. The power wire may be connected between a switch-joint box and another switch-joint box along a ceiling top of the indoor space.

Figure 4:
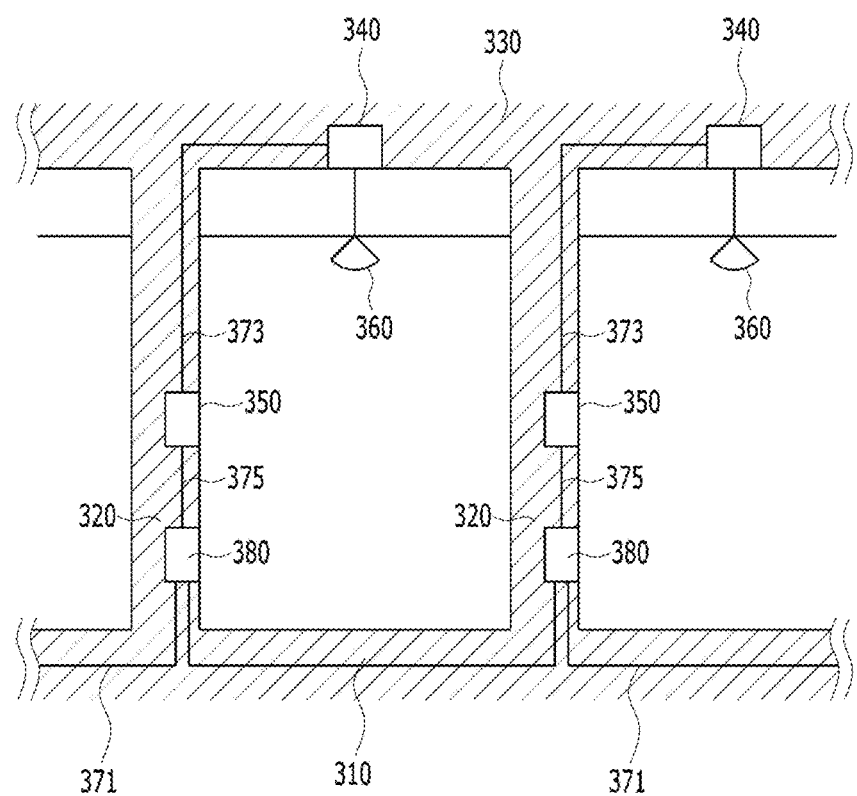
FIG. 4 is a front cross-sectional view illustrating an electrically-wired apartment house according to another embodiment of the present invention.

FIG. 4 is a front cross-sectional view illustrating an electrically-wired apartment house according to another embodiment of the present invention, and the configuration thereof is substantially identical to that of FIG. 3. However, there is a difference in that, instead of the switch box 350, a receptacle box 380 doubles as a joint box.

In the electrical wiring structure with connection points arranged on side walls according to the present invention, a worker can perform wire connection work in the joint box disposed on the side wall while looking straight ahead without performing work for connection of power and light wires while climbing up a ladder, thereby improving work efficiency and reducing a risk of injury due to falling off the ladder. In addition, it is possible to improve work efficiency since maintenance work due to short circuit or poor connection is also performed in the joint box.

As illustrated in FIG. 5, since the power wire 371 is arranged on the ceiling immediately above the switch box 350, it is possible to significantly reduce wire materials compared to the conventional electrical wiring structure.

The embodiments described herein and the accompanying drawings merely illustrate some of the technical ideas included in the present invention. Accordingly, since the embodiments disclosed herein are not intended to limit the technical spirit of the present invention but to explain it, it is obvious that the scope of the technical spirit of the present invention is not limited by these embodiments. Therefore, all modifications and specific embodiments that can be easily inferred by those skilled in the art within the scope of the technical spirit included in the specification and drawings of the present invention should be construed as falling within the scope of the present invention.

INDUSTRIAL APPLICABILITY

The present invention is applicable to electrical wiring work in an apartment house.

The invention claimed is:

1. An electrical wiring structure with connection points arranged on side walls, comprising:
   a first power wire drawn out of a distribution box and disposed through a first conduit embedded in a concrete-made bottom base or ceiling top of an indoor space;
   a first joint box embedded at a predetermined height in a first side wall formed in the indoor space and electrically connected to the first power wire;
   a first light wire electrically connected to the first joint box; and
   a second joint box embedded at a predetermined height in a second side wall formed in the indoor space and electrically connected to the first joint box by a second power wire disposed through a second conduit embedded in the bottom base or ceiling top of the indoor space,
   wherein the first joint box doubles as a switch box configured to switch a first light electrically connected to a first light box by the first light wire.

2. The electrical wiring structure according to claim 1, wherein the first and second power wires are disposed in the first and second conduits embedded immediately below or above the first and second joint boxes.

3. An electrical wiring structure with connection points arranged on side walls, comprising:
   a first power wire drawn out of a distribution box and disposed through a first conduit embedded in a concrete-made bottom base or ceiling top of an indoor space;
   a first joint box embedded at a predetermined height in a first side wall formed in the indoor space and electrically connected to the first power wire;
   a first light wire electrically connected to the first joint box; and
   a second joint box embedded at a predetermined height in a second side wall formed in the indoor space and electrically connected to the first joint box by a second power wire disposed through a second conduit embedded in the bottom base or ceiling top of the indoor space,
   wherein the first joint box doubles as a receptacle box electrically connected to the first and second power wires.

4. The electrical wiring structure according to claim 3, wherein the first and second power wires are disposed in the first and second conduits embedded immediately below or above the first and second joint boxes.

5. A method of constructing electrical wiring with connection points arranged on side walls, comprising:
   embedding a joint box at a predetermined height in a side wall formed in an indoor space of a building;
   embedding a conduit immediately below or above the joint box and in a concrete-made bottom base or ceiling top of the indoor space;
   electrically connecting a distribution box to the joint box using a power wire passing through the conduit; and
   electrically connecting the joint box to a light box embedded in the ceiling of the indoor space using a light wire,
   wherein the joint box doubles as a switch box configured to switch a light electrically connected to a light box by the light wire.

6. A method of constructing electrical wiring with connection points arranged on side walls, comprising:
   embedding a joint box at a predetermined height in a side wall formed in an indoor space of a building;
   embedding a conduit immediately below or above the joint box and in a concrete-made bottom base or ceiling top of the indoor space;
   electrically connecting a distribution box to the joint box using a power wire passing through the conduit; and
   electrically connecting the joint box to a light box embedded in the ceiling of the indoor space using a light wire,
   wherein the joint box doubles as a receptacle box electrically connected to the power wire.

* * * * *